UNITED STATES PATENT OFFICE.

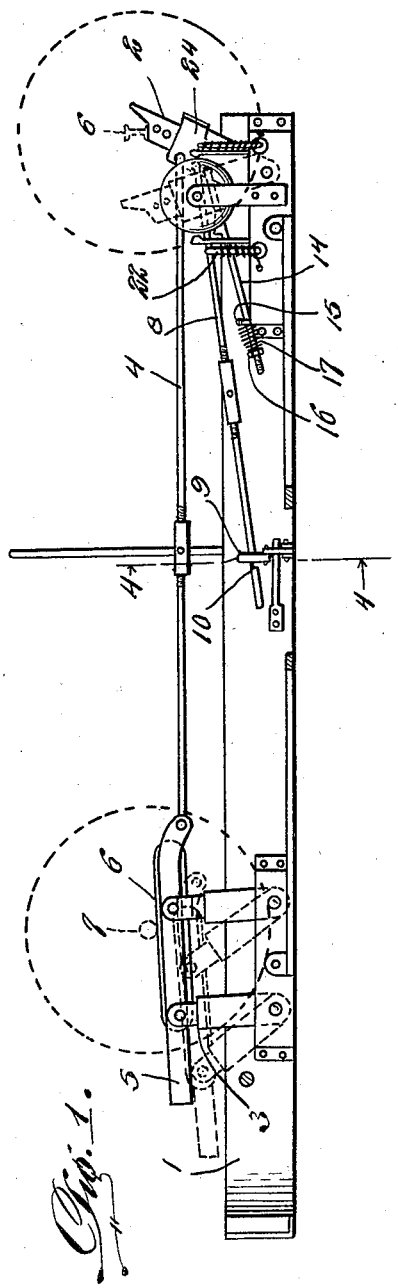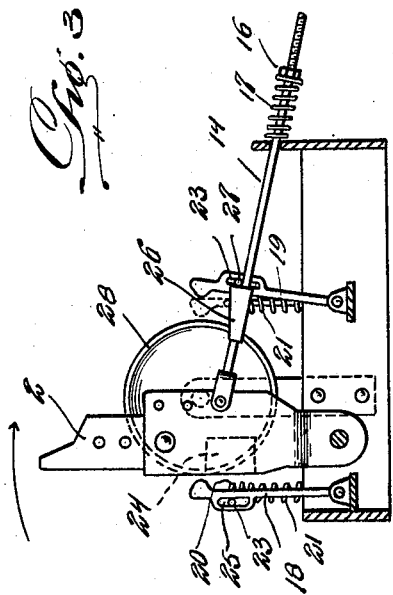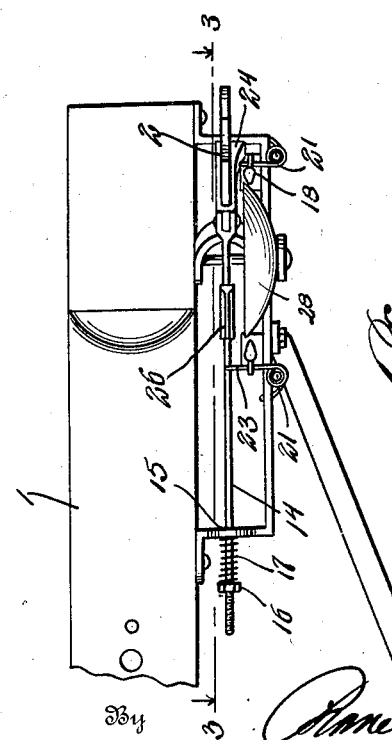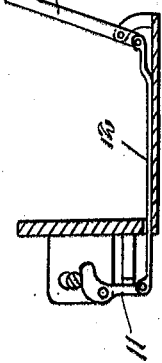

LOUIS M. FISHER, OF CLARKSDALE, MISSOURI.

ALARM FOR AUTOMOBILE-JACKS.

1,387,137. Specification of Letters Patent. Patented Aug. 9, 1921.

Application filed August 26, 1920. Serial No. 406,070.

*To all whom it may concern:*

Be it known that I, LOUIS M. FISHER, a citizen of the United States, residing at Clarksdale, in the county of DeKalb, and State of Missouri, have invented new and useful Improvements in Alarms for Automobile-Jacks, of which the following is a specification.

This invention relates to an alarm mechanism for use in conjunction with automobile jacks or lifters of the type shown in my United States Patent No. 1,345,842, dated July 6, 1920.

With this type of automobile jack or lifter, a swinging support, consisting of swinging front and rear axle supporting arms connected for movement in unison are provided to support the vehicle. When the vehicle is moved thereon in one direction, the swinging support is moved in such direction with the vehicle and to raise the vehicle in an elevated position, said support being locked in such position. When the locking mechanism is raised the swinging support swings in the reverse direction by gravity under the weight of the vehicle, and lowers the vehicle so that the wheels will again come in contact with the ground.

The object of my present invention is to provide an alarm mechanism, consisting of alarm devices respectively actuated upon the movement of the swinging frame to its reversed positions, thus indicating positively to the operator or attendant that the device has made a full movement in the direction to lift the vehicle, in which position it will be automatically locked, or that it has made a full movement in the reverse direction to lower the vehicle to the floor line. The device, used in this connection, will also serve to give a warning when an attempt is made by an unauthorized person to operate the jack or to release a vehicle held thereon.

The invention consists of the features of construction, combination and arrangement of parts, hereinafter fully described and claimed, reference being had to the accompanying drawing, in which:—

Figure 1 is a sectional side elevation of the device, showing in full lines the parts when swung forwardly to support and lift the vehicle, and showing in dotted lines the arms moved rearwardly to vehicle releasing position.

Fig. 2 is a top plan view of parts shown in Fig. 1, and particularly illustrating the alarm mechanism.

Fig. 3 is a vertical section on the line 3—3 of Fig. 2.

Fig. 4 is a transverse section taken substantially on the line 4—4 of Fig. 1.

The device embodies a frame 1, including track rails (not shown) on which the vehicle runs to bring it in position to be engaged by the swinging support. This swinging support comprises front swinging arms 2 and rear swinging arms 3. I have shown in the drawing the parts of the mechanism at one side only of the frame 1, which are duplicated in practice at the opposite side of the frame, from which it will be understood that a single arm 2 is provided at each side of the frame and two or more arms 3 at each side of the frame. These arms 2 and 3 are pivotally mounted at their lower ends to swing longitudinally of the frame, and the arms at each side of the frame are coupled for swinging movement in unison by a rod 4. The rod 4 is pivoted to the arm 2 at its forward end and at its rear end 2 to a supporting bar or rail 5, said bar or rail 5 being pivotally connected with the upper ends of the arms 3. The arms 2 are adapted to engage and support the front axle 6 of the vehicle, while the bars 5 are provided with suitable guideways to receive sliding wear plates 6' which engage and support the rear axle 7 of the vehicle. The construction is thus such that the wear plates 6' are adapted to slide upon the bars 5 in the back and forth movements of the vehicle to diminish wear and tear upon the axle 7 and the coöperating parts of the jack.

A latch bar 8 is pivoted at its forward end to one of the arms 2 and is slidably mounted at its opposite end through an opening in a keeper plate 9 and provided with a notch 10 adapted to engage a portion of said keeper plate, when the swinging support is moved forwardly to vehicle elevating position, to lock the support in such position until the latch is released. Upon the release of the latch the swinging support will move rearwardly and the swinging arms will assume the dotted line position shown in Fig. 1 under the weight of the vehicle, which will travel rearward by gravity and again be lowered to the floor line. It will be observed that when the arms 2 and 3 are in normal or lowered position, both sets of arms 2 and 3 will be inclined rearwardly beyond center, or beyond the vertical line of their pivots, while when said arms 2 and 3 are swung forwardly, the arms 2 will be moved to a forward position beyond center or beyond the vertical lines of their pivots, while the arms 3 will assume a substantially perpendicular position. The keeper 9 carries a bell crank lever 11, one arm of which is arranged to engage the latch bar 8, while the other arm thereof is connected by a rod 12 with a controlling lever 13. By manipulating this lever 13 the bell crank lever 11 may be operated to lift the bar 8 and thus release the notch 10 from engagement with the keeper 9, thus freeing the swinging support for movement from vehicle raising to vehicle lowering position.

Pivotally connected at one end with an arm 2 is a retracting rod 14 slidably movable at its opposite end through a guide 15, the latter-named end of the rod being threaded to receive an adjusting and tensioning nut 16, and a coiled spring 17 being arranged on the rod between the guide and nut. When the swinging support moves forward to vehicle raising position this spring is tensioned and remains tensioned as long as the support is locked in vehicle raising position by the latch bar 8, the spring 17 by this reaction serving to assist in swinging the support backward as soon as unlatched, so as to effect the ready and easy removal of the support back from reverse position and the lowering of the vehicle.

I provide an alarm mechanism operative on reverse movements of the swinging support to indicate such movements. This alarm mechanism comprises a pair of pivotally mounted bell hammers 18 and 19 and coacting coiled operating springs 20 and 21. Each of these springs is mounted upon a supporting rod 22 suitably fastened to the frame, and the lower end of each spring is suitably fastened to the supporting rod or to the frame, while the opposite or upper end of the spring is extended at an angle and slidably connected with its bell hammer as indicated at 23. One of the arms 2 is provided with a contact 24 to engage the end 25 of the spring 21 associated with the hammer 18, while the rod 14 is provided with a contact to engage the end 27 of the spring associated with the hammer 19.

The parts described are so arranged that upon the forward swinging movement of the swinging support the contact 24 will engage and wipe past the end 25 of the spring 21 associated with the hammer 18, thus tensioning said spring and then releasing it, whereby the hammer 18 will be vibrated to tap a gong 28 to indicate full movement of the jack to vehicle elevating position. On the reverse movement of the swinging support the contact 26 will engage and wipe past the end 27 of the spring 21 associated with the hammer 19, thus first tensioning and then releasing said spring whereby said hammer will be vibrated to tap the gong 28, giving a signal that the jack has been actuated to release the vehicle. It will thus be understood that the alarm device provides a convenient means for indicating to an operator or attendant that each movement of the jack to raising or lowering position has been positively accomplished. Also it will be evident that the alarm device will give a warning signal whenever the device is tampered with by mischievous or malicious persons, and further that it is adapted to sound a warning in the event that any unauthorized person attempts to remove a vehicle supported upon the jack.

Having thus fully described my invention, I claim:

1. In combination with an automobile jack employing a swinging member, of a gong arranged adjacent to said member, a clapper pivoted adjacent to said gong, a spring normally holding said clapper retracted from said gong, an end of said spring slidably engaged with said clapper, and a contact member on said swinging member adapted to engage said spring end when moved in one direction to first retract the spring and the clapper and then to release the same to the action of said spring.

2. In combination with a vehicle jack employing a swinging member, of a gong, a pair of clappers arranged adjacent to said gong and adapted to be moved into contact with the latter, springs normally holding said clappers withdrawn from said gong, means whereby movement of the swinging member in one direction will actuate the clapper to strike the gong, and means whereby movement of the swinging member in the reverse direction will operate to actuate the other of said clappers to strike the gong.

In testimony whereof I affix my signature.

LOUIS M. FISHER.